(12) United States Patent
Alfieri et al.

(10) Patent No.: US 7,961,178 B1
(45) Date of Patent: Jun. 14, 2011

(54) METHOD AND SYSTEM FOR REORDERING ISOCHRONOUS HUB STREAMS

(75) Inventors: Robert A. Alfieri, Chapel Hill, NC (US); Patrick R. Marchand, Apex, NC (US)

(73) Assignee: NVIDIA Corporation, Santa Clara, CA (US)

( * ) Notice: Subject to any disclaimer, the term of this patent is extended or adjusted under 35 U.S.C. 154(b) by 991 days.

(21) Appl. No.: 11/747,431

(22) Filed: May 11, 2007

(51) Int. Cl.
*G09G 5/00* (2006.01)
(52) U.S. Cl. ........................................ 345/204; 345/211
(58) Field of Classification Search .......... 345/530–574, 345/204, 214
See application file for complete search history.

(56) References Cited

U.S. PATENT DOCUMENTS

| | | | | |
|---|---|---|---|---|
| 5,414,808 | A | * | 5/1995 | Williams ........................ 715/723 |
| 5,841,771 | A | * | 11/1998 | Irwin et al. ..................... 370/360 |
| 6,046,709 | A | | 4/2000 | Shelton et al. |
| 6,457,081 | B1 | * | 9/2002 | Gulick ........................... 710/305 |
| 6,501,441 | B1 | | 12/2002 | Ludtke et al. |
| 6,924,843 | B1 | | 8/2005 | Yamazaki et al. |
| 7,308,514 | B1 | * | 12/2007 | Hewitt et al. ................... 710/66 |
| 7,692,642 | B2 | | 4/2010 | Wyatt |
| 2004/0012581 | A1 | | 1/2004 | Kurokawa et al. |

OTHER PUBLICATIONS

Office Action, U.S. Appl. No. 11/695,557 dated Oct. 26, 2010.
Office Action, U.S. Appl. No. 11/695,557, dated Apr. 27, 2010.

\* cited by examiner

*Primary Examiner* — Nitin Patel
(74) *Attorney, Agent, or Firm* — Patterson & Sheridan, LLP

(57) ABSTRACT

One embodiment of the present invention sets forth a method and system for reordering a plurality of pixel data returned by a frame buffer in a display system. The method includes the steps of recording the order of a plurality of requests for pixel data arriving at the frame buffer as a first sequence, wherein the plurality of requests is further associated with a first request stream, associating each pixel data returned by a frame buffer partition in the frame buffer in response to the plurality of requests with an independently operating data thread, wherein each of the data threads is further associated with the first request stream and the frame buffer partition, and retrieving the pixel data for display in a same sequence as the first sequence from the data threads.

20 Claims, 9 Drawing Sheets

METHOD AND SYSTEM FOR REORDERING ISOCHRONOUS HUB STREAMS

BACKGROUND OF THE INVENTION

1. Field of the Invention

Embodiments of the present invention relates generally to display technologies and more specifically to a method and system for reordering isochronous hub streams.

2. Description of the Related Art

Unless otherwise indicated herein, the approaches described in this section are not prior art to the claims in this application and are not admitted to be prior art by inclusion in this section.

Multi-head display systems, which support multiple display devices such as monitors, televisions, and projectors, are becoming increasingly popular. Each display device in such a display system is an output isochronous function and imposes strict timing constraints for receiving display data from the memory subsystem of the display system. To satisfy such timing constraints, one approach is to include an isochronous hub to manage the multiple streams of traffic traveling in between the multi-heads and the memory subsystem. This isochronous hub is disclosed in the U.S. patent application titled, "Isochronous Hub Contracts," filed on Apr. 2, 2007 and having U.S. patent application Ser. No. 11/695,557 (the "Related Application").

FIG. 1A is a simplified diagram of a multi-head display system 100 utilizing such an isochronous hub. In particular, the multi-head display system 100 includes a display device 110 supporting two display heads and a memory subsystem 102. The memory subsystem 102 further includes a frame buffer 104 with multiple partitions (e.g., $PA_0$-$PA_N$) and an isochronous hub 106. The isochronous hub 106 ensures the establishment of a contract for an entire frame of data between the display device 110 and the memory subsystem 102 before the memory subsystem 102 delivers any of the requested data. The "contract" here refers to a collection of parameters associated with the request for the frame of data. With the established contract, the isochronous hub 106 proceeds to facilitate the transmission of N streams of requests to the frame buffer 104 to retrieve data from different partitions for each of the two display heads.

In addition, the isochronous hub 106 supports multiple channels carrying different types of data to the two heads of the display device 110. Specifically, a channel 108 of the isochronous hub 106 carries contract-related communication data for establishing, amending, and managing the contracts between the memory subsystem 102 and the display device 110. A first set of channels, channels 120, 122, and 124, and a second set of channels, channels 126, 128, and 130, transmit information associated with different types of display data received from the frame buffer 104 to head 0 and head 1, respectively. FIG. 1B is a conceptual diagram of a display screen including three different types of display data, namely, base data 150, overlay data 152, and cursor data 154. The base address (e.g., ADDR), the screen coordinates (e.g., the Xs and Ys), and the base address offsets (e.g., the X_BASE_OFFs and Y_BASE_OFFs) associated with the three display data types also correspond to physical locations of various buffers in the frame buffer 104 as shown in FIG. 1C, namely a base buffer 160, a overlay buffer 162, and a cursor buffer 164. It is worth noting that each of these buffers corresponds to one or more frame buffer partitions. For example, the base buffer 160 may correspond to $PA_0$-$PA_3$, and the cursor buffer 164 may correspond to $PA_N$. Because each of these partitions operates independently from one another, the isochronous hub 106 lacks any mechanism to ensure the sequence of data received from the partitions matches the sequence of the requests it sends to the frame buffer 104.

To illustrate, suppose the isochronous hub 106 receives a stream of requests for base data from the base buffer 160, a request $stream_0$. In response, the isochronous hub 106 first transmits a request associated with the request $stream_0$ to $PA_A$, denoted as request ($PA_A$), and then transmits a request associated with the request $stream_0$ to $PA_B$, denoted as request ($PA_B$), to the frame buffer 104. Without any corrective mechanism, the isochronous hub 106 is likely to improperly receive the requested data corresponding to the request ($PA_B$) before the requested data corresponding to the request ($PA_A$).

As the foregoing illustrates, what is needed in the art is a method and system for ensuring the sequence of data from the frame buffer partitions match the sequence of requests issued to the frame buffer partitions.

SUMMARY OF THE INVENTION

One embodiment of the present invention sets forth a method and system for reordering a plurality of pixel data returned by a frame buffer in a display system. The method includes the steps of recording the order of a plurality of requests for pixel data arriving at the frame buffer as a first sequence, wherein the plurality of requests is further associated with a first request stream, associating each pixel data returned by a frame buffer partition in the frame buffer in response to the plurality of requests with an independently operating data thread, wherein each of the data threads is further associated with the first request stream and the frame buffer partition, and retrieving the pixel data for display in a same sequence as the first sequence from the data threads.

One advantage of the disclosed method and system is that multiple streams of requests for a frame buffer can be processed by multiple independently operating frame buffer partitions, because the sequence of pixel data returned by the frame buffer partitions is ensured to correctly match the sequence of the requests received by the frame buffer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
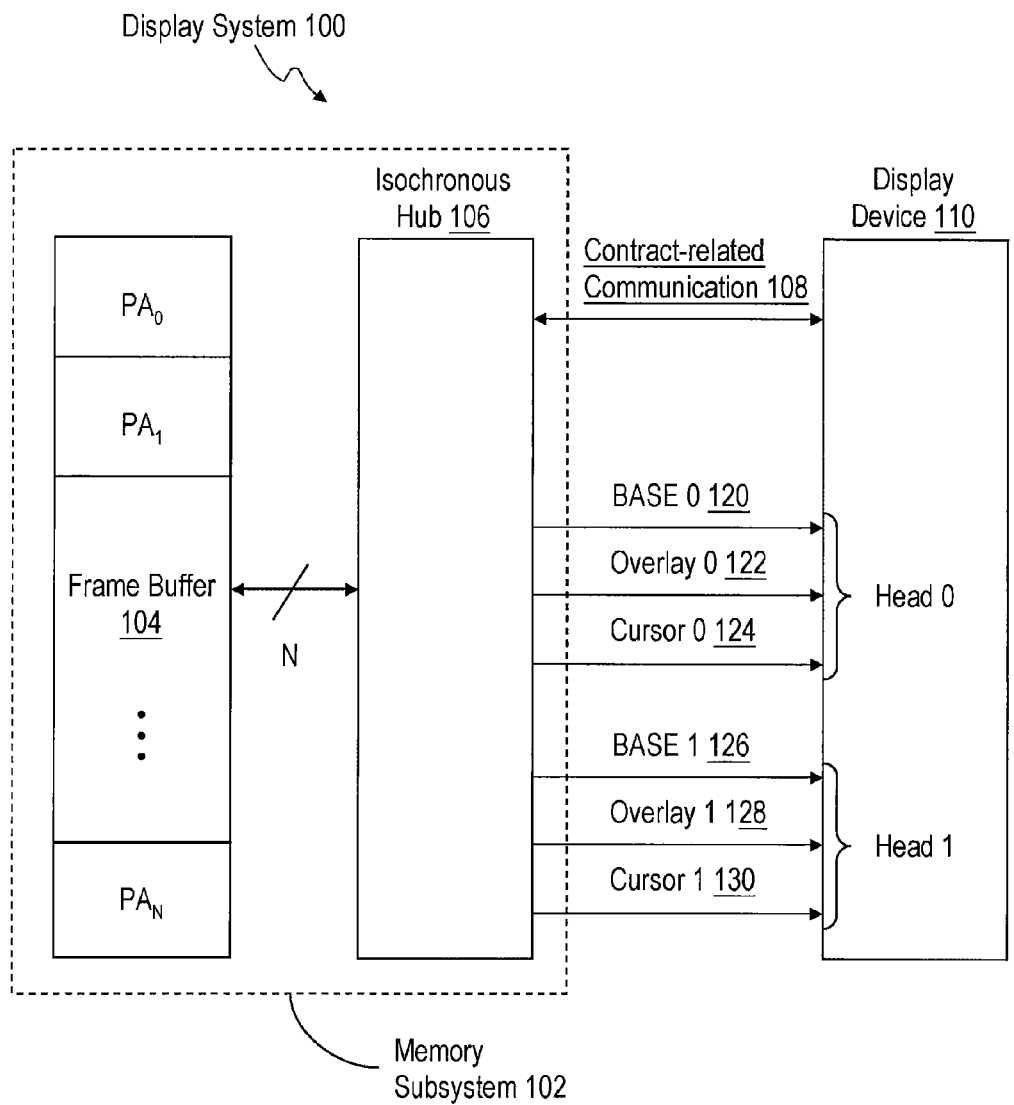
FIG. 1A is a simplified diagram of a multi-head display system utilizing an isochronous hub.
Figure 1B:
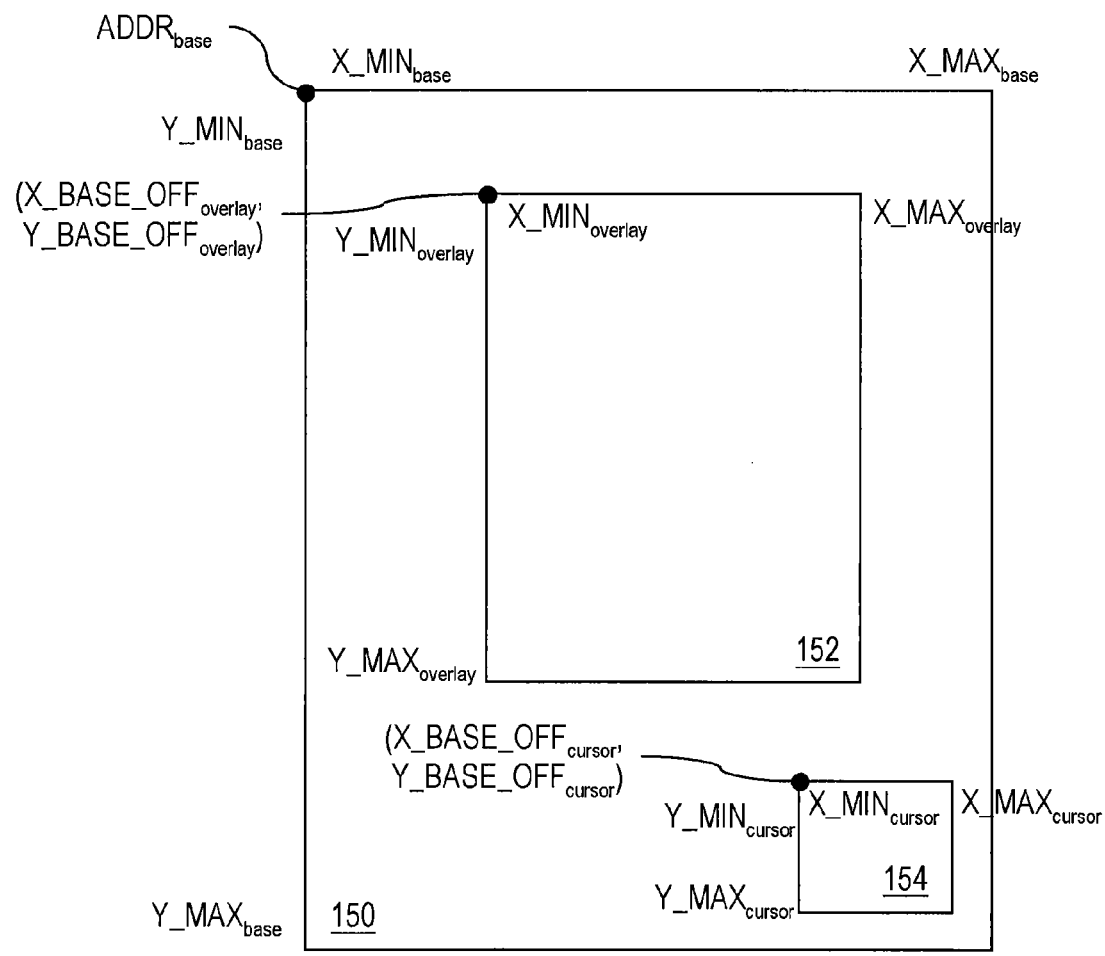
FIG. 1B is a conceptual diagram of a frame buffer containing various buffers for different types of pixel data.
Figure 1C:
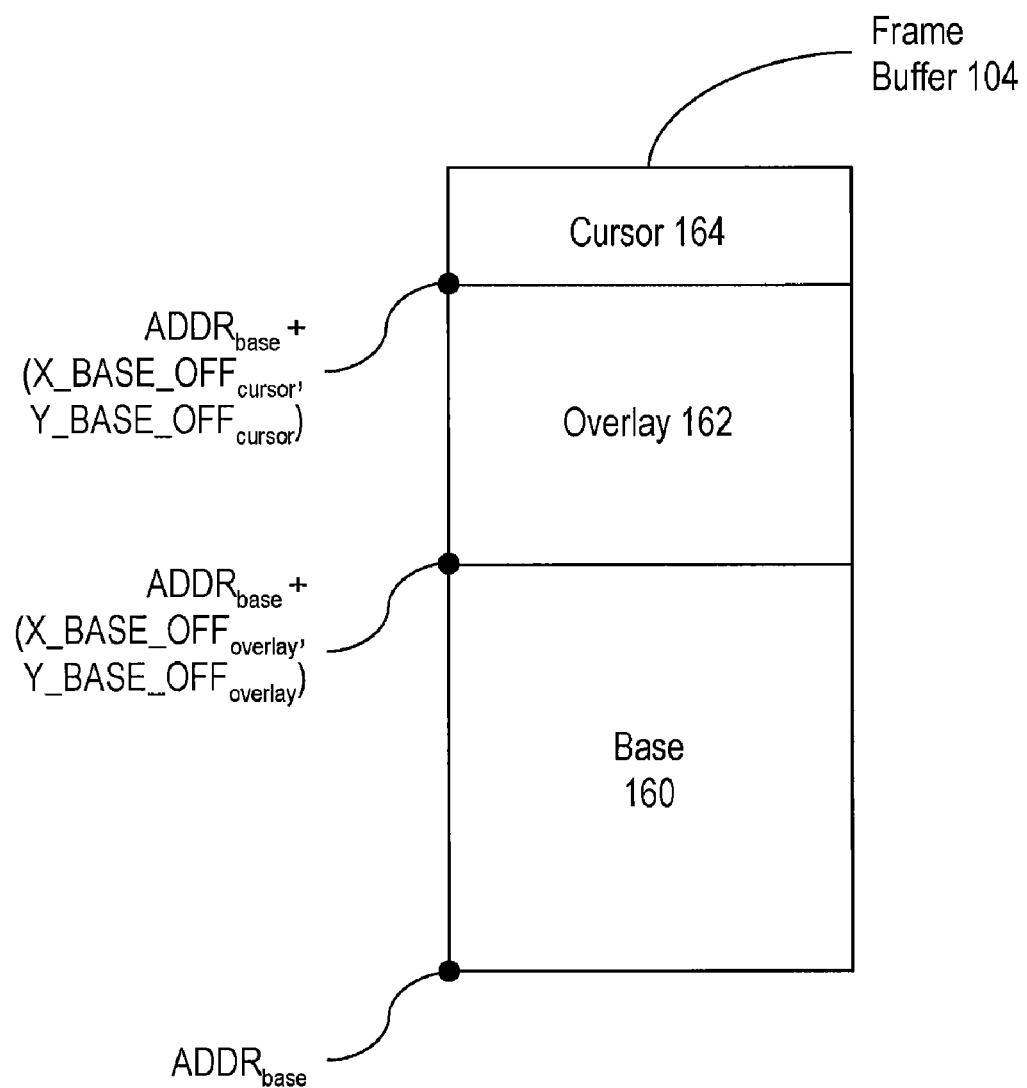
FIG. 1C illustrates a number of display rectangles in the screen space corresponding to the frame buffer shown in FIG. 1B.
Figure 2:
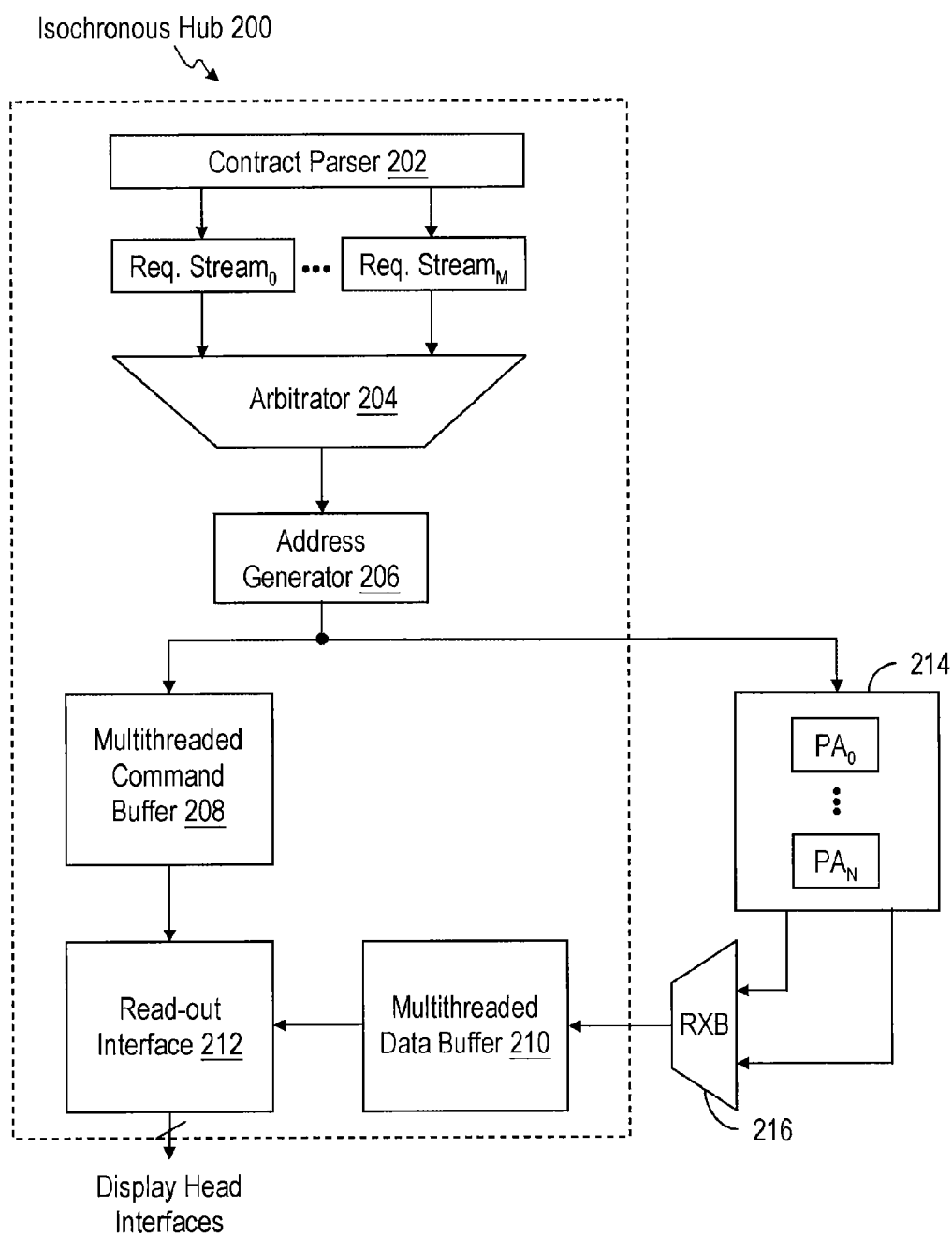
FIG. 2 is a simplified block diagram of an isochronous hub capable of reordering data from frame buffer partitions, according to one embodiment of the present invention.

FIG. 2 is a simplified block diagram of an isochronous hub 200 capable of reordering data from frame buffer partitions, according to one embodiment of the present invention. Specifically, the isochronous hub 200 includes a parser 202, an arbitrator 204, an address generator 206, a multithreaded command buffer 208, a multithreaded data buffer 210, and a read-out interface 212. In one implementation, the isochronous hub 200 facilitates a contract-based communication session between a frame buffer 214 and one or more display heads. As discussed above, the Related Application discloses how such a session is conducted. Here, the parser 202 mainly extracts information, such as one or more request streams, from an established contract. Each request stream includes individual requests for a particular type of display data from a specific buffer within the frame buffer 214, and each of these requests is further associated with attributes of the buffer and the relative locations of the requested display data within the buffer. For instance, a request stream$_0$ may include requests for base data from the base buffer 160 as shown in FIG. 1C, and each of these requests is further associated with the attributes of the base buffer 160 and the relative locations of the requested base data within the base buffer 160, which are represented in terms of the $ADDR_{base}$ and the $(X_{base}, Y_{base})$ screen coordinates as shown in FIG. 1B. Then, the arbitrator 204 arbitrates among the M request streams and passes on a selected request stream, such as the request stream$_0$, to the address generator 206. The address generator 206 then translates the relative locations associated with each request into physical addresses corresponding to certain frame buffer partitions in the frame buffer 214 and directs the request with the translated physical address to both the multithreaded readout buffer 208 and the frame buffer 214.

Figure 3A:
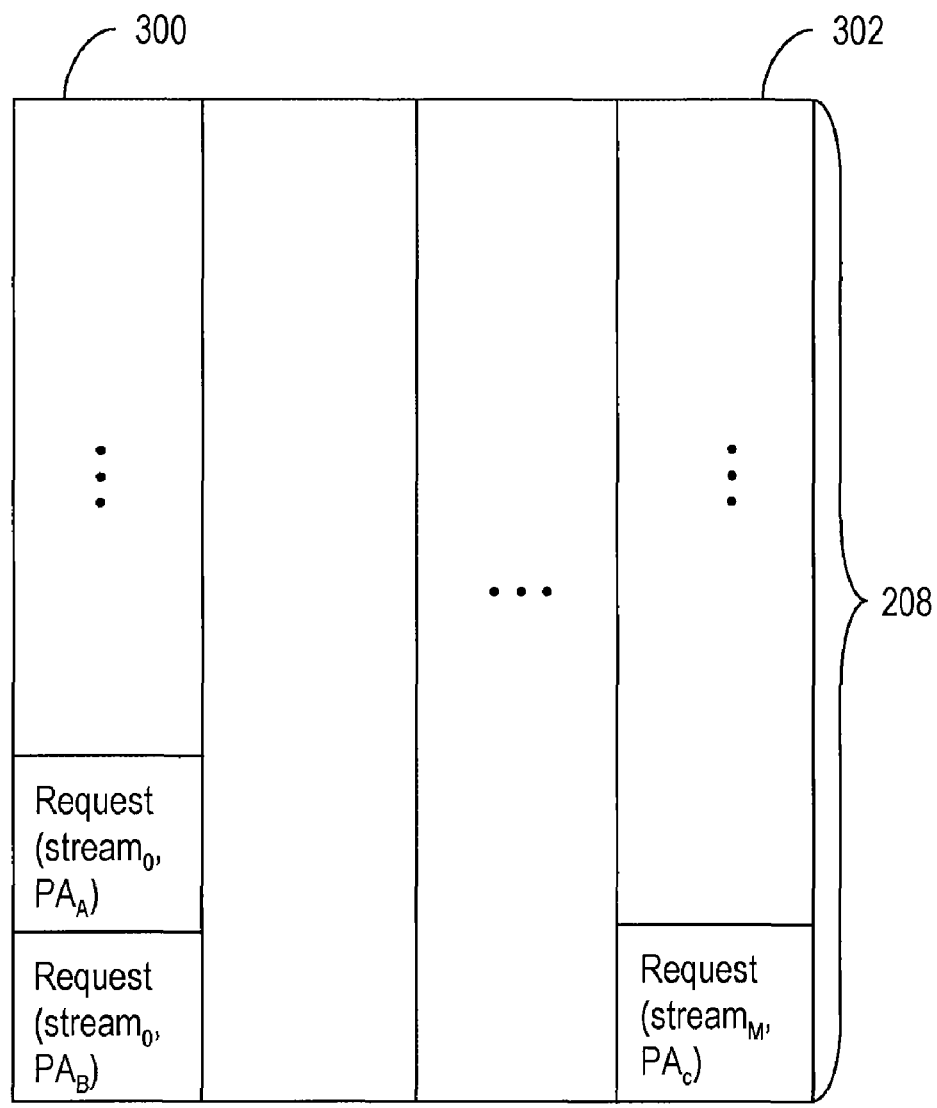
FIG. 3A is a conceptual diagram of a multithreaded command buffer, according to one embodiment of the present invention.

FIG. 3A is a conceptual diagram of the multithreaded command buffer 208, according to one embodiment of the present invention. The multithreaded command buffer 208 mainly tracks the sequence of the requests from the various request streams arriving at the multithreaded command buffer 208. Since the address generator 206 also forwards these same requests to the frame buffer 214, the arrival sequence recorded by the multithreaded command buffer 208 is the same as the arrival sequence at the frame buffer 214. In one implementation, the multithreaded command buffer 208 is divided into multiple independently operating logical buffers, each of which stores the requests associated with a particular request stream in a first-in-first-out sequence. To illustrate, suppose a logical buffer 300 is designated to store the requests associated with the request stream$_0$, and a logical buffer 302 is designated to store the requests associated with a request stream$_M$. Suppose further that the address generator 206 forwards three requests to the multithreaded command buffer 208 and the frame buffer 214 in the following sequence: (1) a request for $PA_B$ of the frame buffer 214, and the request is associated with the request stream$_0$ and is denoted as a request (stream$_0$, $PA_B$), (2) a request for $PA_C$ of the frame buffer 214, and the request is associated with the request stream$_M$ and is denoted as a request (stream$_M$, $PA_C$), and (3) a request for $PA_A$ of the frame buffer 214, and the request is associated with the request stream$_0$ and is denoted as a request (stream$_0$, $FA_A$). To record this arrival sequence, as shown in FIG. 3A, the logical buffer 300 stores the request (stream$_0$, $PA_B$) before the request (stream$_0$, $FA_A$), and the logical buffer 302 stores the request (stream$_M$, $PA_C$).

As the multithreaded command buffer 208 records the arrival sequence of the incoming requests, the various frame buffer partitions in the frame buffer 214 also respond to these same requests. As mentioned above, since each of the requested frame buffer partition operates independently, the data returned by the requested frame buffer partitions do not arrive at a return crossbar ("RXB") 216 in the same sequence as the frame buffer 214 receives the incoming requests. To reorder these out-of-order returned data, instead of directly forwarding the returned data to display head interfaces for display, the RXB 216 directs the returned data to the multithreaded data buffer 210, which is further illustrated in FIG. 3B.

In one implementation, the multithreaded data buffer 210 includes multiple independently operating data threads, each of which stores returned data associated with a specific request stream and a specific frame buffer partition. The number of these data threads thus equals to the number of request streams (e.g., M) multiplying by the number of frame buffer partitions (e.g., N). So, as shown in FIG. 3B, the multithreaded data buffer 210 designates a data thread 350 to store the returned data corresponding to the request (stream$_0$, $FA_A$) and a data thread 352 to store the returned data corresponding to the request (stream$_0$, $PA_B$).

With the arrival sequence of the requests stored in the multithreaded command buffer 208 and the returned data from the frame buffer 214 stored in the multithreaded data buffer 210, the read-out interface 212 reorders, whenever necessary, the returned data based on the recorded arrival sequence. FIG. 3C is a conceptual diagram of the read-out interface 212, according to one embodiment of the present invention. Specifically, the read-out interface 212 includes M read-out finite state machines ("FSMs"). Each read-out FSM is responsible for a request stream and independently performs tasks based on a state transition diagram shown in FIG. 3D.

Figure 3B:
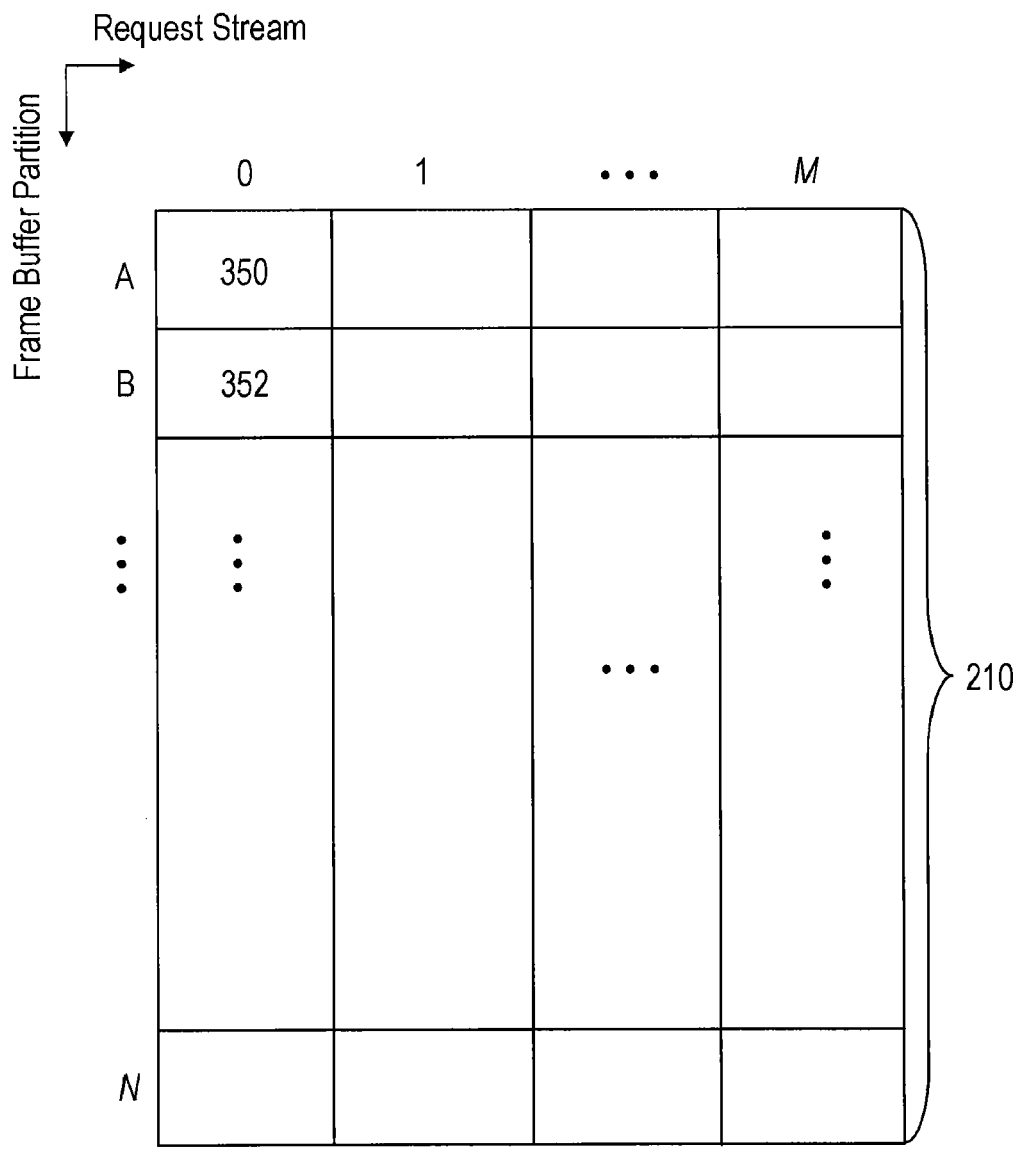
FIG. 3B is a conceptual diagram of a multithreaded data buffer, according to one embodiment of the present invention.
Figure 3C:
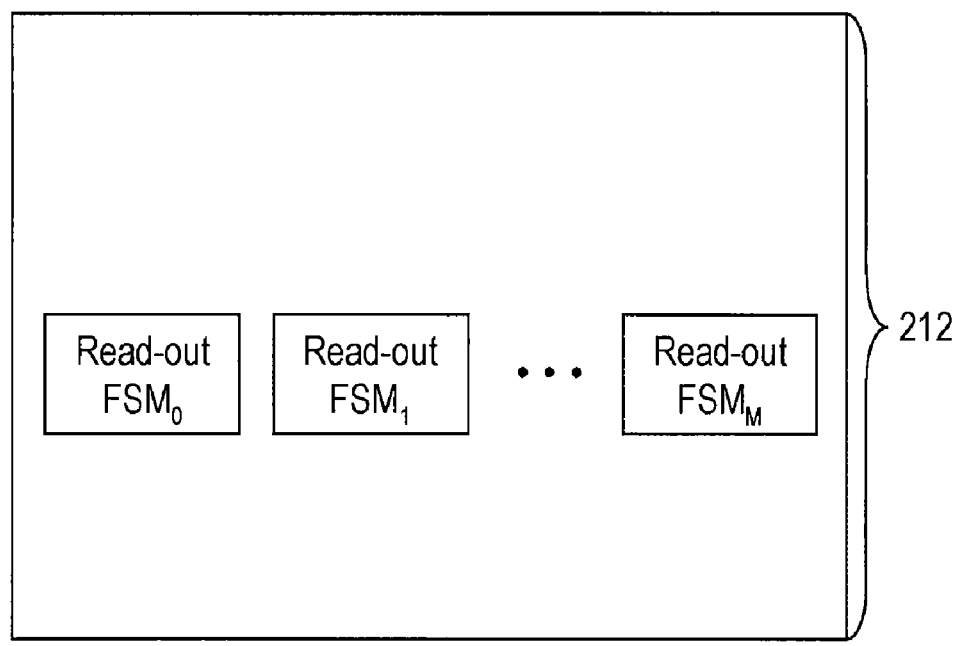
FIG. 3C is a conceptual diagram of a read-out interface, according to one embodiment of the present invention.
Figure 3D:
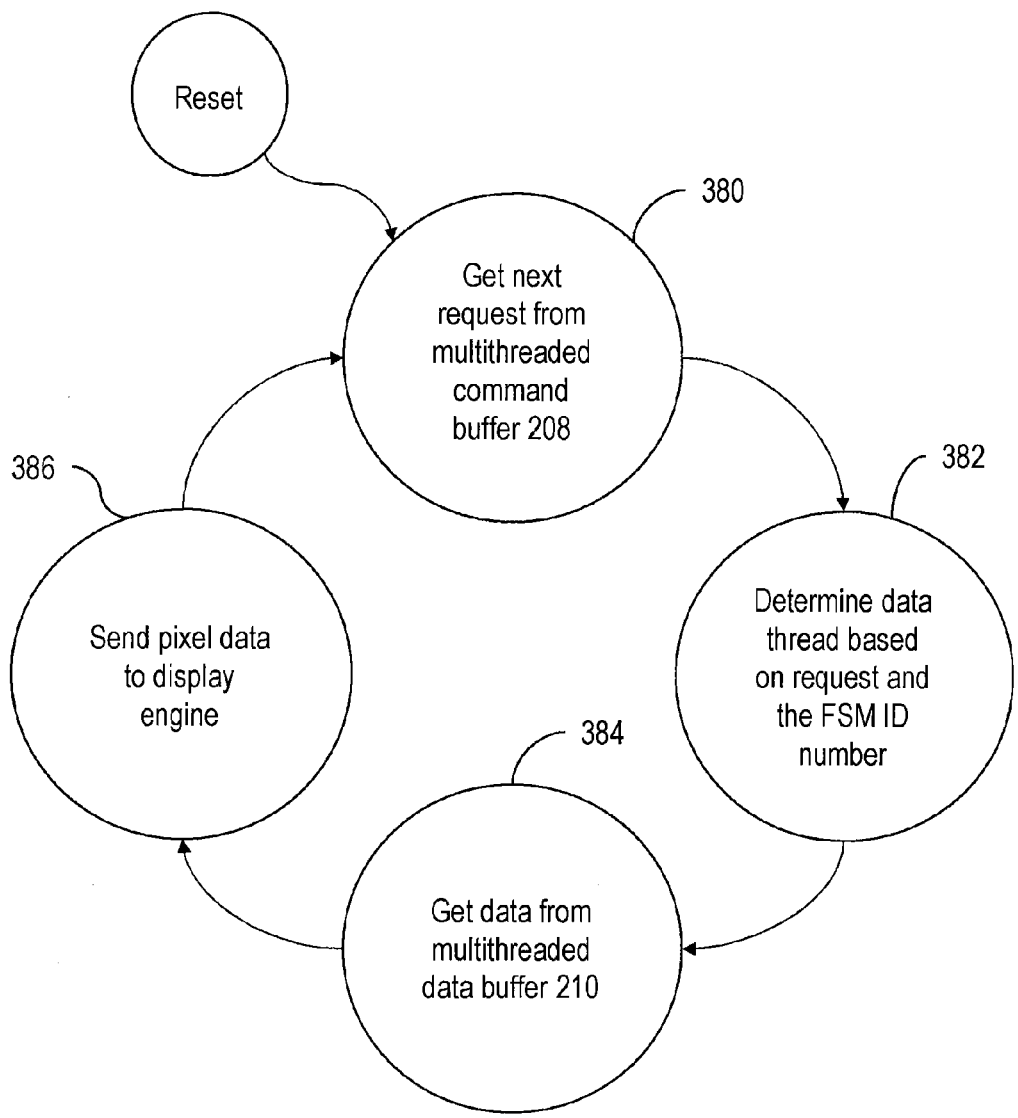
FIG. 3D is a state transition diagram for one of multiple state machines in the read-out interface, according to one embodiment of the present invention.

Referring back to the contents of the multithreaded command buffer 208 of FIG. 3A and the multithreaded data buffer 210 of FIG. 3B as an example, since a read-out $FSM_0$ corresponds to the request stream$_0$, the read-out $FSM_0$ retrieves the first-in request (stream$_0$, $PA_B$) from the logical buffer 300 of FIG. 3A in a state 380. In a state 382, the read-out $FSM_0$ determines the data thread within the multithreaded data buffer 210 that stores the desired pixel data by using the information in the request (stream$_0$, $PA_B$), such as the request stream number and the frame buffer partition, and also its own identification number. In this example, because the FSM identification number and the request stream number both equal to zero and the frame buffer partition is $PA_B$, the read-out $FSM_0$ in a state 384 retrieves the returned data associated with the data thread 352 of FIG. 3B. If $PA_B$ fails to return data to the data thread 352 at the time the read-out $FSM_0$ attempts to retrieve data from it, then the read-out $FSM_0$ waits. The read-out $FSM_0$ does not attempt to retrieve data from other data threads that are associated with the request stream$_0$ in the multithreaded data buffer 210, such as the data thread 350, even if such a data thread contains pixel data. In other words, if the frame buffer 214 receives the aforementioned request (stream$_0$, $PA_B$) ahead of the request (stream$_0$, $PA_A$) but the frame buffer partition $PA_A$ responds out-of-order and responds before $PA_B$, the read-out FSM still waits for the data thread 352 to receive the returned pixel data from $PA_B$. After the read-out $FSM_0$ successfully retrieves the returned data, it sends such pixel data to a display engine in a state 386. As has been demonstrated, by using the multithreaded command buffer 208 and the multithreaded data buffer 210, the read-out FSMs are able to reorder the out-of-order responses from the various frame buffer partitions before the display of the returned pixel data.

Figure 4:
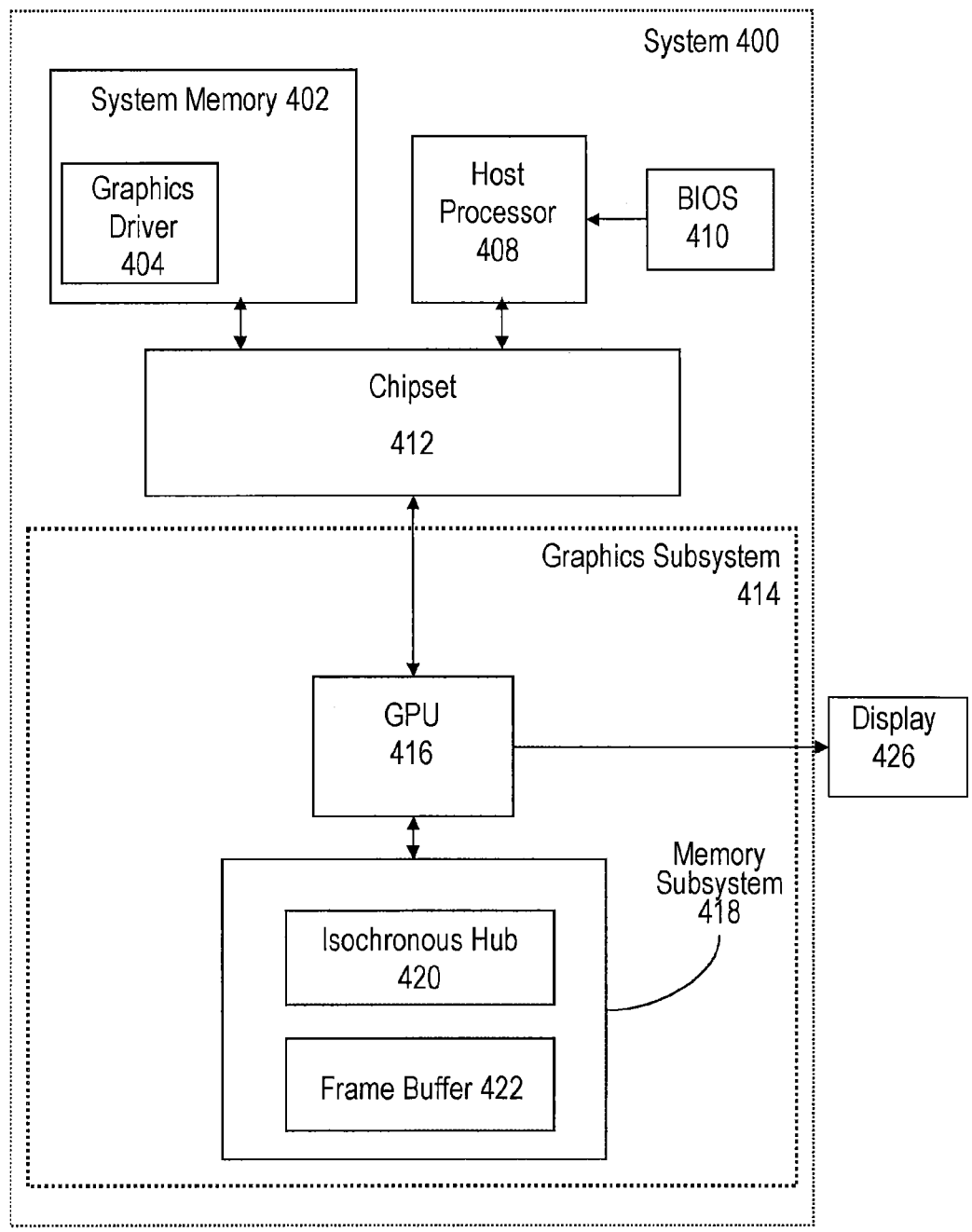
FIG. 4 is a block diagram of a system configured to implement one or more aspects of the present invention.

FIG. 4 is a block diagram of a system configured to implement one or more aspects of the present invention. Without limitation, system 400 may be a desktop computer, server, laptop computer, palm-sized computer, tablet computer, game console, cellular telephone, hand-held device, mobile device, computer based simulator, or the like. System 400 includes a host processor 408, BIOS 410, system memory 402, and a chipset 412 that is directly coupled to a graphics subsystem 414. BIOS 410 is a program stored in read only memory ("ROM") or flash memory that is executed at bootup. The graphics subsystem 414 includes a graphics processing unit ("GPU") 416. In alternate embodiments, the host processor 408, the GPU 416, the chipset 412, or any combination thereof, may be integrated into a single processing unit. Further, the functionality of the GPU 416 may be included in a chipset or in some other type of special purpose processing unit or co-processor.

A graphics driver 404, stored within the system memory 402, configures the GPU 416 to share the graphics processing workload performed by the system 400 and communicate with applications that are executed by the host processor 408. In one embodiment, the graphics driver 404 generates and places a stream of commands in a "push buffer." When the commands are executed, certain tasks, which are defined by the commands, are carried out by the GPU 416.

In some embodiments of the system 400, the chipset 412 provides interfaces to the host processor 408, memory devices, storage devices, graphics devices, input/output ("I/O") devices, media playback devices, network devices, and the like. It should be apparent to a person skilled in the art to implement the chipset 412 in two or more discrete devices, each of which supporting a distinct set of interfaces.

The GPU 416 is responsible for outputting image data to a display 426. The Display 426 may include one or more display devices, such as, without limitation, a cathode ray tube ("CRT"), liquid crystal display ("LCD"), or the like. The GPU 416 is also coupled to a memory subsystem 418. The memory subsystem 418 further includes an isochronous hub 420, which is detailed above and illustrated in FIG. 2, and frame buffer 422.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for reordering a plurality of pixel data returned by a frame buffer in a display system, the method comprises:
   recording the order of a plurality of requests for pixel data arriving at the frame buffer as a first sequence, wherein the plurality of requests is further associated with a first request stream;
   associating each pixel data returned by a frame buffer partition in the frame buffer in response to the plurality of requests with an independently operating data thread executing in a multithreaded processor, wherein each of the data threads is further associated with the first request stream and a different frame buffer partition in the frame buffer; and
   retrieving the pixel data for display in a same sequence as the first sequence from the data threads.

2. The method of claim 1, wherein the retrieving step further comprising:
   retrieving a first request out of the plurality of requests according to the first sequence;
   identifying a first data thread out of the data threads corresponding to the first request and are associated with the first request stream; and
   waiting until the first data thread receives the pixel data returned by the frame buffer partition before retrieving a second request out of the plurality of requests according to the first sequence.

3. The method of claim 1, further comprising extracting the first request stream from a contract-based communication session between a display device and a memory subsystem in the display system.

4. The method of claim 3, further comprising arbitrating among a plurality of request streams extracted from the contracted-based communication session to select the first request stream.

5. The method claim 1, wherein each of the plurality of requests includes physical addresses corresponding to a frame buffer partition in the frame buffer.

6. The method of claim 5, further comprising deriving the physical addresses from relative locations in the screen space for a type of pixel data in a specific buffer in the frame buffer.

7. The method of claim 6, further comprising forwarding the plurality of requests with the physical addresses and the first request stream to both the frame buffer and a multithreaded command buffer.

8. The method of claim 7, wherein the multithreaded command buffer further includes a plurality of independently operating logical buffers, one of which is responsible for storing the plurality of requests associated with the first request stream and maintaining the first sequence.

9. An isochronous hub configured to reorder a plurality of pixel data returned by a frame buffer in a display system, the isochronous hub comprises:
   a multithreaded command buffer configured to record the order of a plurality of requests for pixel data arriving at the frame buffer as a first sequence, wherein the plurality of requests is further associated with a first request stream;
   a multithreaded data buffer configured with a plurality of independently operating data threads, wherein each pixel data returned by a frame buffer partition in the frame buffer in response to the plurality of requests is associated with one of the data threads that is further associated with the first request stream and a different frame buffer partition in the frame buffer; and
   a first finite state machine in a read-out interface corresponding to the first request stream configured to retrieve the pixel data for display in a same sequence as the first sequence from the multithreaded data buffer.

10. The isochronous hub of claim 9, wherein the first finite state machine is further configured to:
    retrieve a first request out of the plurality of requests from the multithreaded command buffer according to the first sequence;
    identify a first data thread out of the data threads in the multithreaded data buffer corresponding to the first request and are associated with the first request stream; and wait until the first data thread receives the pixel data returned by the frame buffer partition before retrieving a second request out of the plurality of requests from the multithreaded command buffer according to the first sequence.

11. The isochronous hub of claim 9, further including a parser configured to extract the first request stream from a contract-based communication session facilitated by the isochronous hub in between a display device and a memory subsystem in the display system.

12. The isochronous hub of claim 11, further including an arbitrator configured to arbitrate among a plurality of request streams extracted from the contracted-based communication session to select the first request stream.

13. The isochronous hub of claim 9, wherein each of the plurality of requests includes physical addresses corresponding to a frame buffer partition in the frame buffer.

14. The isochronous hub of claim 13, further including an address generator configured to derive the physical addresses from relative locations in the screen space for a type of pixel data in a specific buffer in the frame buffer.

15. The isochronous hub of claim 14, wherein the address generator is further configured to forward the plurality of requests with the physical addresses and the first request stream to both the frame buffer and the multithreaded command buffer.

16. The isochronous hub of claim 15, wherein the multithreaded command buffer further includes a plurality of independently operating logical buffers, one of which is responsible for storing the plurality of requests associated with the first request stream and maintaining the first sequence.

17. A computing device configured to transmit pixel data to a display device, the computing device comprises:
an isochronous hub; and
a frame buffer with a plurality of frame buffer partitions, wherein the isochronous hub further including:
  a multithreaded command buffer configured to record the order of a plurality of requests for pixel data arriving at the frame buffer as a first sequence, wherein the plurality of requests is further associated with a first request stream;
  a multithreaded data buffer configured with a plurality of independently operating data threads, wherein each pixel data returned by one of the frame buffer partitions in the frame buffer in response to the plurality of requests is associated with one of the data threads that is further associated with the first request stream and a different frame buffer partition in the frame buffer; and
  a first finite state machine in a read-out interface corresponding to the first request stream configured to retrieve the pixel data for display in a same sequence as the first sequence from the multithreaded data buffer.

18. The computing device of claim 17, wherein the first finite state machine is further configured to:
retrieve a first request out of the plurality of requests from the multithreaded command buffer according to the first sequence;
identify a first data thread out of the data threads in the multithreaded data buffer corresponding to the first request and are associated with the first request stream; and
wait until the first data thread receives the pixel data returned by the frame buffer partition before retrieving a second request out of the plurality of requests from the multithreaded command buffer according to the first sequence.

19. The computing device of claim 17, wherein the isochronous hub further including an address generator configured to forward the plurality of requests with the physical addresses and the first request stream to both the frame buffer and the multithreaded command buffer.

20. The computing device of claim 19, wherein the multithreaded command buffer further includes a plurality of independently operating logical buffers, one of which is responsible for storing the plurality of requests associated with the first request stream and maintaining the first sequence.

* * * * *